US011105628B1

(12) United States Patent
Panosian et al.

(10) Patent No.: US 11,105,628 B1
(45) Date of Patent: Aug. 31, 2021

(54) EXTENDABLE GRADE ROD RECEIVER

(71) Applicant: TOUGHBUILT INDUSTRIES, INC., Lake Forest, CA (US)

(72) Inventors: Michael H. Panosian, Irvine, CA (US); Joshua Keeler, Lake Forest, CA (US)

(73) Assignee: TOUGHBUILT INDUSTRIES, INC., Lake Forest, CA (US)

( * ) Notice: Subject to any disclaimer, the term of this patent is extended or adjusted under 35 U.S.C. 154(b) by 0 days.

(21) Appl. No.: 17/184,381

(22) Filed: Feb. 24, 2021

(51) Int. Cl.
*G01C 15/06* (2006.01)
*G01C 15/00* (2006.01)

(52) U.S. Cl.
CPC .......... *G01C 15/06* (2013.01); *G01C 15/002* (2013.01)

(58) Field of Classification Search
CPC .............................. G01C 15/06; G01C 15/002
See application file for complete search history.

(56) References Cited

U.S. PATENT DOCUMENTS

| 173,938 | A | * | 2/1876 | Gieseler | G01C 15/06 |
| | | | | | 33/293 |
| 3,190,008 | A | * | 6/1965 | Weiss | G01B 3/06 |
| | | | | | 33/709 |
| 3,857,639 | A | * | 12/1974 | Mason | G01C 15/006 |
| | | | | | 356/400 |
| 4,023,908 | A | * | 5/1977 | Johnson | G01C 15/004 |
| | | | | | 356/141.3 |
| 4,029,415 | A | * | 6/1977 | Johnson | G01C 15/004 |
| | | | | | 356/4.08 |
| 4,119,382 | A | | 10/1978 | George et al. | |
| 4,471,532 | A | * | 9/1984 | Francis | G01C 15/06 |
| | | | | | 33/294 |

(Continued)

FOREIGN PATENT DOCUMENTS

| EP | 0034537 A1 | 2/1982 |
| GB | 1341246 | 12/1973 |

OTHER PUBLICATIONS

AGL C8, LS-100, Lightning Laser Detector Receiver Rod Clamp Sip In Style, https://www.benchmarkarizona.com/agl-c8-LS100-Lightning2-laser-detector-receiver-rod-clamp_8_23_321.html, 5 pages.

(Continued)

*Primary Examiner* — Nimeshkumar D Patel
*Assistant Examiner* — Tania Courson
(74) *Attorney, Agent, or Firm* — Nolte Lackenbach Siegel; Myron Greenspan

(57) ABSTRACT

An extendable grade rod receiver includes a plurality of elongate telescoping rods provided with elongate channels along their lateral edges. A receiver receives a reference beam from a remote transmitter includes a carriage movable along the rods and coupled to the receiver for sharing axial movements. The carriage is provided with wheels moveable in directions generally normal to the axis. The wheels are receivable within the elongate channels of all of the rods and are inwardly biased towards the axis to retain the wheels within the channels or grooves of any of the rods as the carriage moves over the steps or discontinuities as it moves from one rod to a next adjacent rod. Visual and machine-readable indicia are provided on the elongate front surfaces of the telescoping rods that can be encoded by a reader module on the receiver. Other mating rolling or sliding profiles can be used.

20 Claims, 8 Drawing Sheets

(56) References Cited

U.S. PATENT DOCUMENTS

| | | | | |
|---|---|---|---|---|
| 5,551,159 | A | * | 9/1996 | Mooty ................. G01C 15/002 33/228 |
| 6,450,267 | B2 | | 9/2002 | Ohtomo et al. |
| 6,657,734 | B1 | * | 12/2003 | Monz ..................... G01C 15/00 33/293 |
| 7,251,899 | B2 | * | 8/2007 | Yandrick ................ G01C 15/06 33/294 |
| 7,266,898 | B2 | | 9/2007 | El-Katcha et al. |
| 7,448,138 | B1 | * | 11/2008 | Vanneman ........... G01C 15/006 33/290 |
| 7,788,815 | B2 | * | 9/2010 | Yandrick ................ G01C 15/06 33/294 |
| 10,545,021 | B2 | | 1/2020 | Horky et al. |
| 2006/0283030 | A1 | * | 12/2006 | Lee ....................... G01C 15/06 33/293 |
| 2013/0133214 | A1 | * | 5/2013 | Steffensen .............. G01C 9/02 33/296 |

OTHER PUBLICATIONS

Bosch TP320 TELESKOPS rotary laser, TP320 telescopic rod-Green, https://www.amazon.co.uk/Bosch-TELESKOPS-rotary-telescopic-rod-Green/dp/B00NW3S2HK/ref=sr_1_1_sspa?keywords=Bosch+Tp320&qid=1578668620&sr=8-1-spons&psc=1, 7 pages.
Bosch TP320 TELESKOPS rotary laser, TP320 telescopic rod-Green, https://www.youtube.com/watch?v=MZx_hr8ltlg, 4 pages.

\* cited by examiner

EXTENDABLE GRADE ROD RECEIVER

BACKGROUND OF THE INVENTION

1. Field of the Invention

The present invention generally relates to measurement instruments and, more Specifically, to an extendable grade rod receiver.

2. Description of the Prior Art

The concept of a laser level has been around since at least the early 1970s, and the spinning-mirror design laser transmitter since the late 1980s. Laser levels are typically used with grade rods. In surveying and construction, the laser level consists of a rotating laser beam projector or transmitter that can be affixed to a tripod. The tool is leveled according to the accuracy of the device and projects a fixed red or green beam in a plane about the horizontal and/or vertical axis.

A grade rod carried by the operator is equipped with a movable receiver or sensor that can detect the laser beam to generate a signal when the sensor is in line with the beam (usually an audible beep). The position of the receiver on the graduated grade rod allows comparison of elevations between different points on the terrain.

Grade rods can be constructed of a single piece of material or, for significant grade variations, can have multiple adjustable segments that allows the rod to be extended or lengthened. Aluminum rods may adjust length by sections telescoping rods inside of each other. However, most of the prior art extendable rods that support a receiver or receiver holder require the user to physically attach these to the rod and fix the position of the receiver on the rod, typically by applying pressure on a knob or lever.

U.S. Pat. No. 7,448,138 discloses a laser detector and grade rod coupling device that includes a coupling rail formed with flanges. A receiving rail appears to be formed with a channel for receiving the flanges. Once positioned a grade rod coupling device clamping knob can be tightened to press a locking block against the receiving rail to lock the vertical position of the laser detector on the grade rod. This device requires repeated connections of the receiver to the rod by the user, especially when the receiver needs to be moved from one segment of the rod to another.

SUMMARY OF THE INVENTION

Accordingly, it is an object of the invention to provide a grade rod that overcomes the inherent disadvantages in most existing grade rods.

It is another object of the invention to provide a grade rod that is easy and convenient to use.

It is still another object of the invention to provide a grade rod that enables the user to make adjustments quickly in the field or on the job site.

It is yet another object of the invention to provide a grade rod that makes using a multi-segment or telescoping grade rod as easy and convenient as using a single solid length rod.

It is a further object of the invention to provide a grade rod as in the previous objects that is simple in construction and economical to manufacture.

It is still further object of the invention to provide a grade rod of the type under discussion that facilitates measurements and alleviates frustrations in making measurements, particularly, more accurate or precision measurements.

In order to achieve the above objects, as well as others that will become evident hereinafter, an extendable grade rod receiver comprises a plurality of elongate telescoping rods moveable relative to each other along an axis and having an outermost rod having a predetermined width and successive inner rods from the outermost rod having incrementally smaller widths. Each rod defines an elongate front surface and opposing left and right elongate lateral ends, each two adjacent contacting rods forming an exterior step or discontinuity substantially equal to the incremental widths between the two adjacent contacting rods. The rods are provided with a first profile along at least one of the lateral ends. A receiver is provided for receiving a reference beam from a remote transmitter. A carriage movable along the telescoping rods is coupled to the receiver to share movements along the axis with the receiver, the carriage being provided with adjustable means forming a second profile generally conforming to or complementary to the first profile to engage and mate therewith to allow movements of the adjustable means to move relative to and along the telescoping rods along the axis, the adjustable means also being moveable in directions generally normal to the axis and being biased inwardly towards the axis to maintain the adjustable means in contact or in abutment against each of the rods as the carriage moves over a step or discontinuity as it moves from one rod to a next adjacent rod.

BRIEF DESCRIPTION OF THE DRAWINGS

The above and other aspects, features and advantages of the present invention will be more apparent from the following description when taken in conjunction with the accompanying drawings, in which.

DETAILED DESCRIPTION

Figure 1:
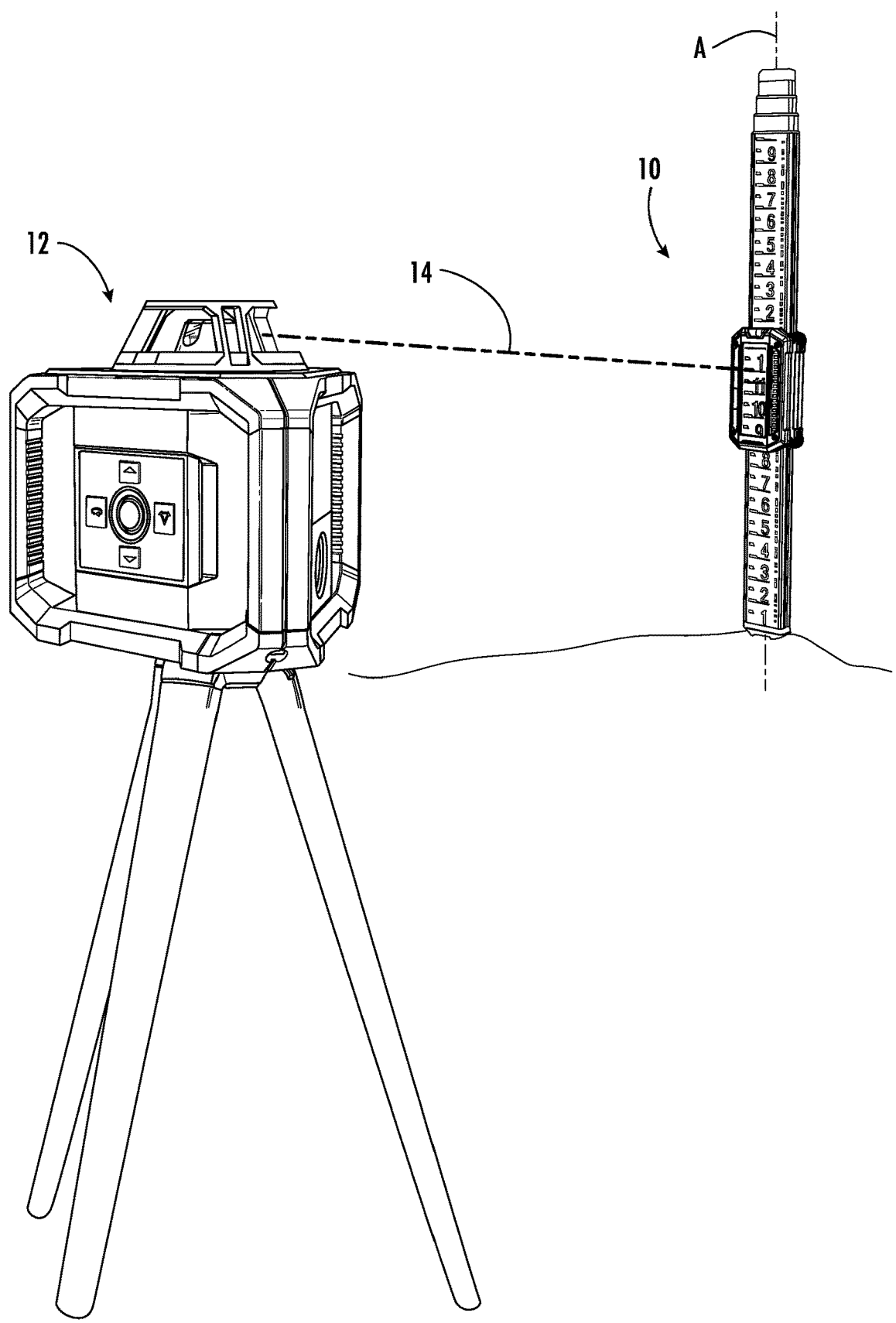
FIG. 1 is a perspective view of an extendable grade rod receiver in accordance with one embodiment of the invention as used with a laser transmitter.

Referring now specifically to the Figures, in which identical or similar parts are designated by the same reference numerals throughout, and first referring to FIG. 1, an extendable grade rod receiver, in accordance with one embodiment of the invention, is generally designated by the reference 10.

The extendable grade rod receiver 10 is used in conjunction with a laser transmitter 12 that generates a laser beam 14 at least a portion of which is intercepted and detected by the grade rod receiver 10 in accordance with well known techniques or procedures.

Figure 2:
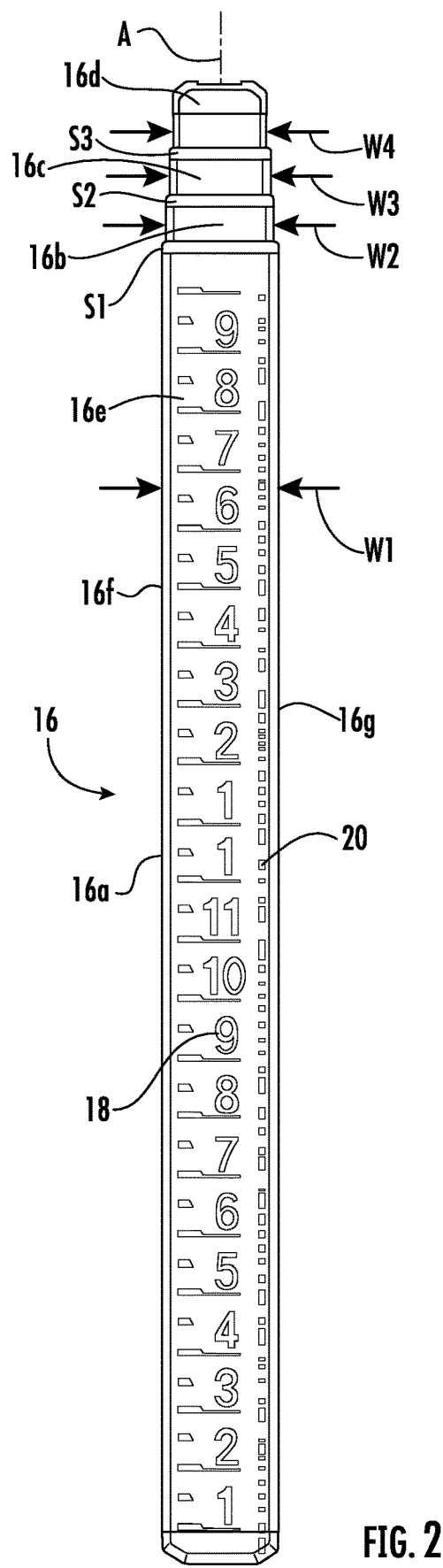
FIG. 2 is a front elevational view of the extendable grade rods that form a part of the grade rod receiver shown in FIG. 1, shown in a collapsed condition.
Figure 3:
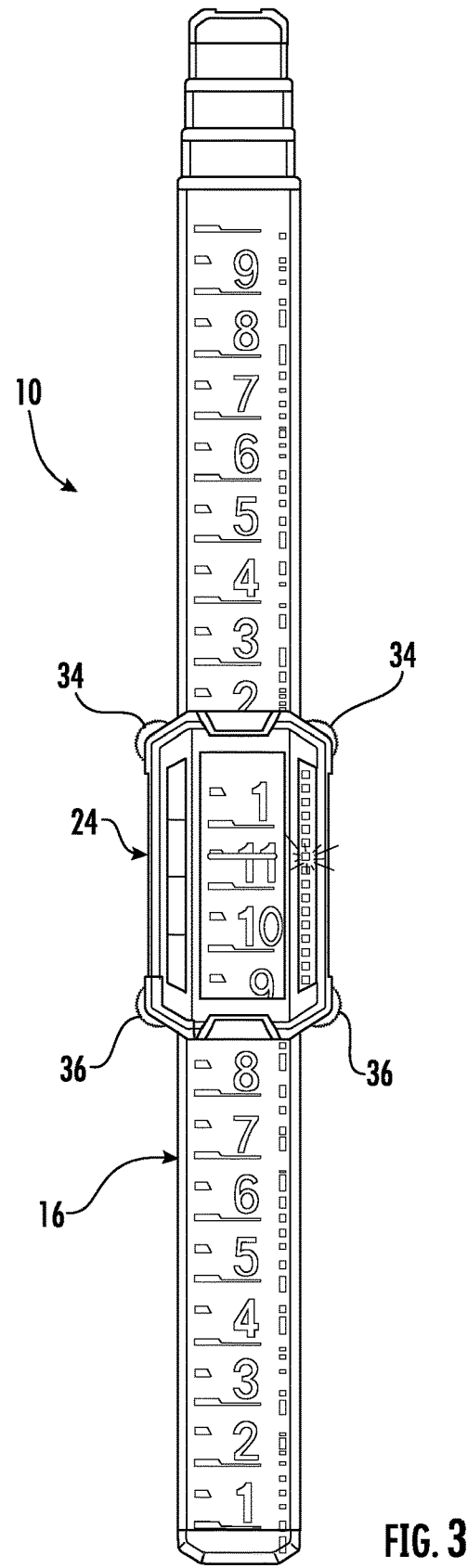
FIG. 3 is similar to FIG. 2, shown with the receiver supported on the lowermost rod.

Referring to FIGS. 2 and 3 the extendable grade rod 16 includes a plurality of elongate telescoping rods 16a-16d movable relative to each other along an axis A and having an outermost rod 16a having a predetermined width W1 and successive inner rods 16b-16d from the outermost rod 16a having incrementally smaller widths W1-W4, respectively. Each rod defines an elongate front surface 16e and opposing left and right elongate lateral ends 16f, 16g, respectively. Each two adjacent contacting rods form a step or discontinuity substantially equal to the incremental widths between the two adjacent contacting rods. A step S1, for example, is formed between rods 16a and 16b. Similarly, step S2 is formed between rods 16c and 16b while Estep S3 is formed between rods 16c and 16d.

Figure 4:
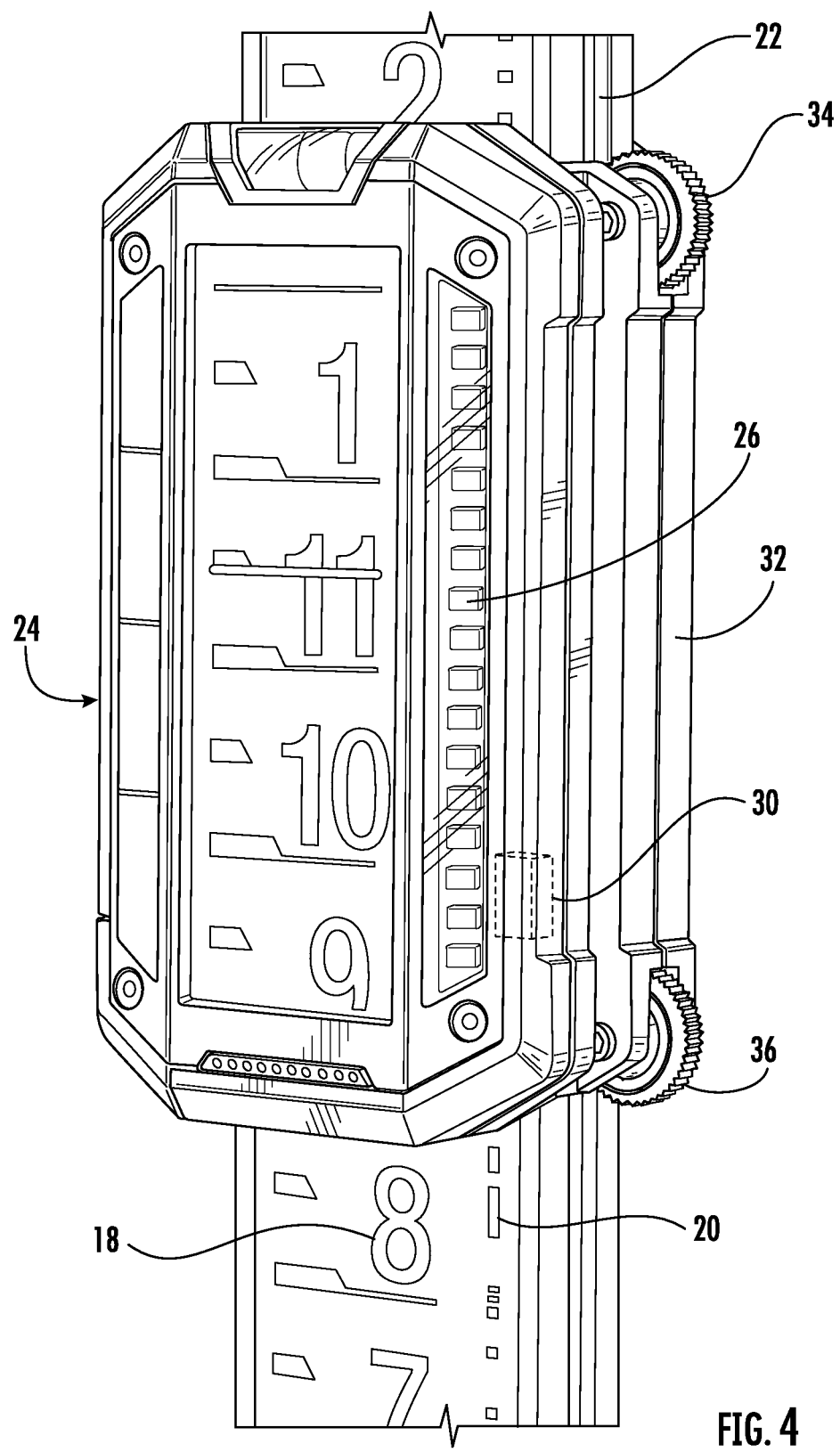
FIG. 4 is an enlarged perspective view of the receiver, also showing the reader module for reading machine readable indicia on the grade rods.
Figure 5:
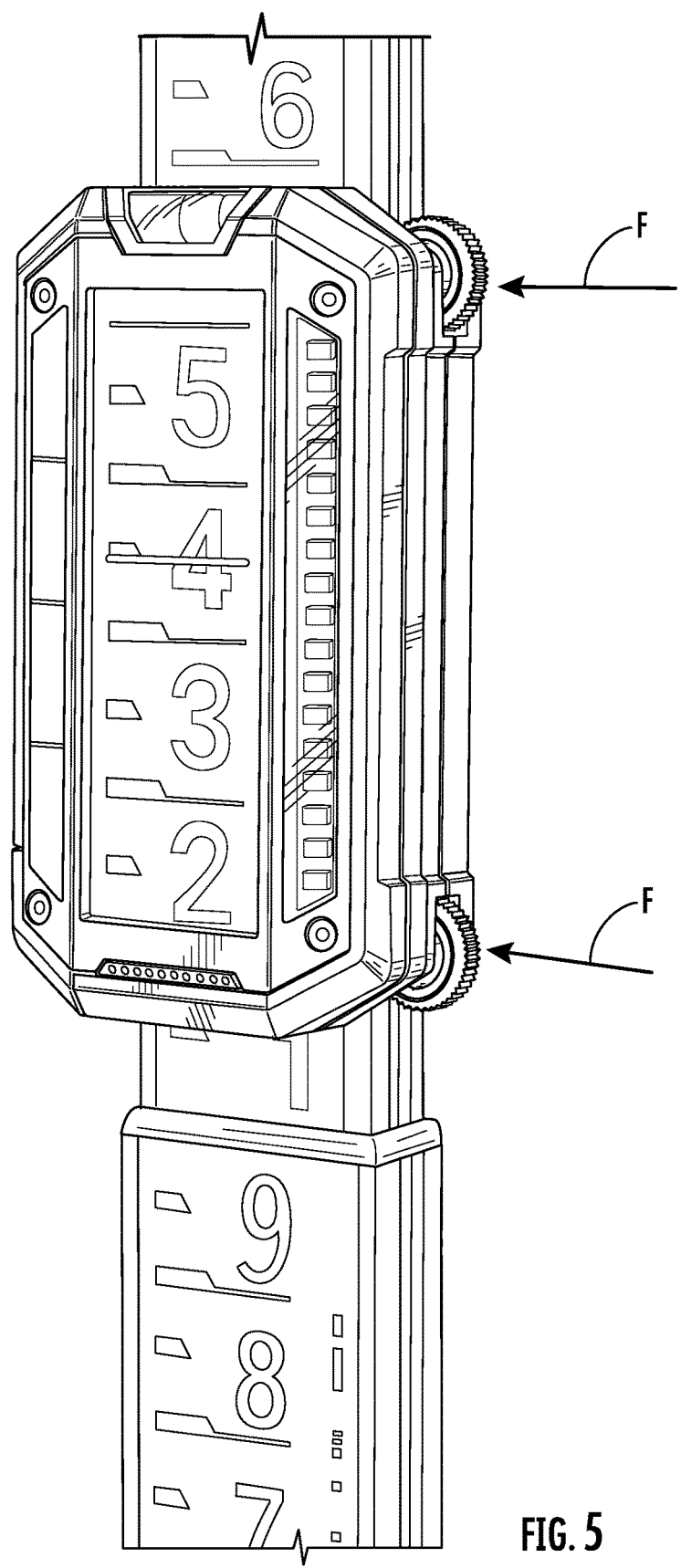
FIG. 5 is similar to FIG. 4, showing the biasing forces acting on the rollers or wheels of the carriage or shuttle that transport the receiver along the extendable rods.
Figure 6:
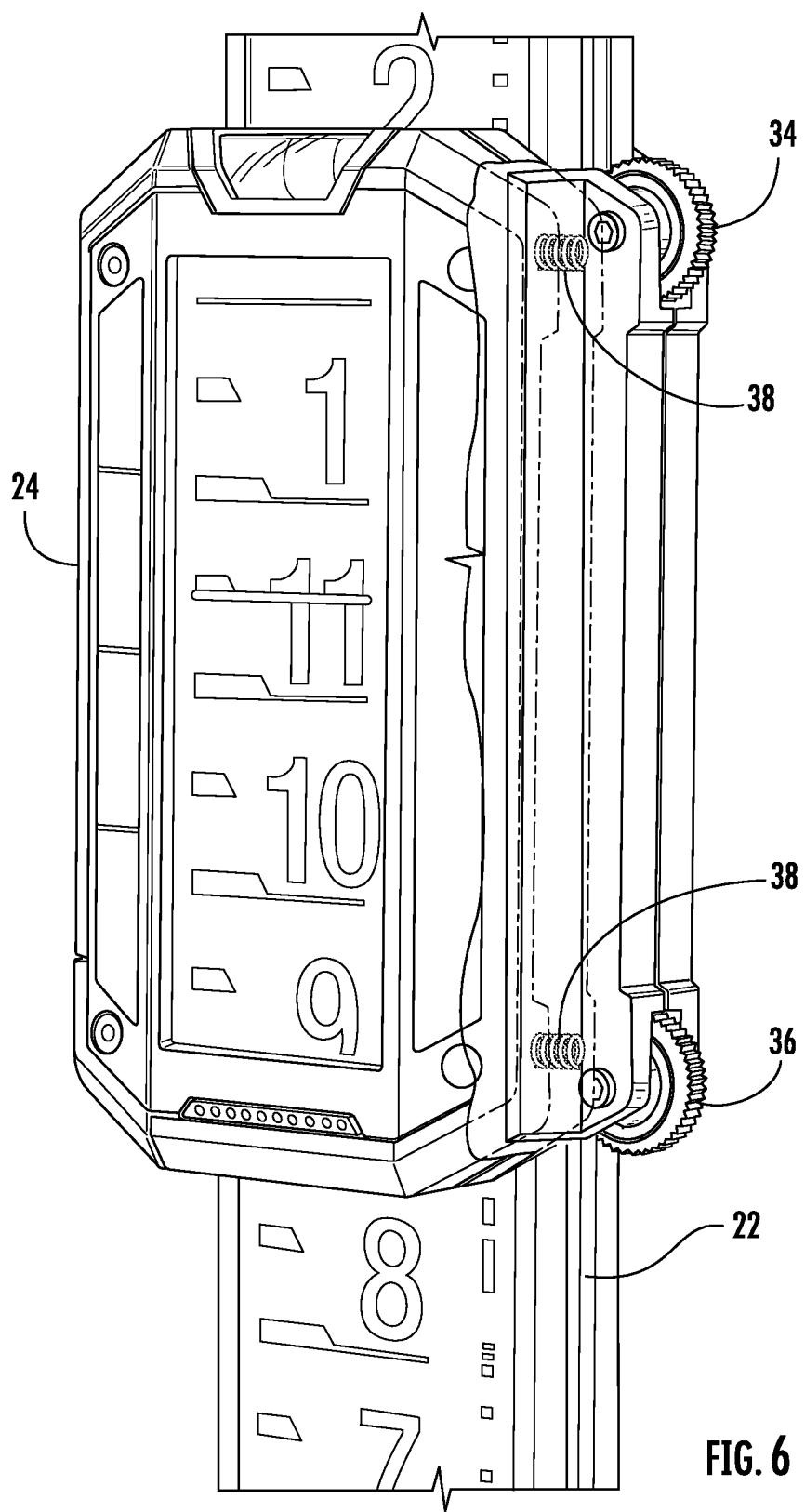
FIG. 6 is similar to FIG. 4, partially broken away to show details of the carriage or shuttle and the tension springs that generate the biasing forces shown in FIG. 5 that draw the shuttle or carriage inwardly towards the center or axis of the grade rod.

As best shown in FIGS. 4-6 each of the rods 16a-16d are provided with an elongate channel or groove 22 along at least one of the lateral ends 16f, 16g. In a presently preferred embodiment, elongate channels or grooves 22 are provided along each of the lateral ends or edges 16f, 16g.

Dimensional indicia are provided on the elongate front surfaces 16e of the telescoping rods. Such dimensional indicia preferably includes visible scales 18 that can be visually observed and read by a user. The dimensional indicia also preferably includes machine readable indicia 20, the specific machine readable indicia used is not critical as long as it can be detected and read by the receiver 24.

The receiver 24 is movably mounted on the grade rods for receiving a reference beam, such as the beam 14 from a remote transmitter 12.

A shuttle or carriage 32 is movably mounted on said rods for movements along the axis A and coupled to the receiver 24 to share movements with the receiver along the axis for transporting the receiver along the rods with movements of the carriage. The carriage 32 includes adjustable means 34, 36 mounted to be receivable within the elongate channel or groove 22 and adjustable for movements in directions generally normal to the axis A. The adjustable means 34, 36 is biased inwardly towards the axis A to always maintain the carriage or shuttle within the channel or groove or otherwise in contact with any of the rods irrespective of the width of the rods on which it is supported, including when the carriage moves from one rod to a next adjacent rod over a step S1-S3, for example.

Although the specific shape or cross-section of the rods is not critical in the illustrated embodiment the rods are substantially flat, as is conventional with most grade rods, and have the front flat surface 16e and left and right edges 16f, 16g in which the channels 22 are formed. In a presently preferred embodiment, channels 22 are formed in both lateral edges. It is possible, however, to provide a channel 22 in only one of these edges.

An important feature of the invention is that the carriage or shuttle 32 includes an adjustable means in the form of a member, in the embodiment 10, receivable within one elongate channel or groove, or both channels or grooves, formed within each of the left and right edges. In the embodiment shown in FIGS. 1-6, such adjustable member includes one or more rollers or wheels. As shown, a plurality of rollers or wheels 34, 36 are spaced from each other along the direction of the axis A to provide better stability and to maintain the receiver 24 aligned with the rods on which it is supported. Additionally, the use of axially spaced rollers or wheels allows at least one of the rollers or wheels to be retained in the channel of one of the rods while the other wheel may be traversing one of the steps or discontinuities 40 between 2 adjacent rides. Since successively inner rods have different widths the rollers or wheels 34, 36, is mounted on the shuttle or carriage 32 must be able to move towards and away from the axis to compensate for the different widths. In addition to such adjustability, the shuttle or carriage 32, or the wheels mounted thereon, are biased inwardly towards the axis A. In this way, when the receiver 24 moves upwardly over successive rods the carriage 32 moves inwardly to accommodate the smaller width rods. Similarly, when the receiver moves downwardly over successive rods the carriage 32 moves outwardly to accommodate the larger with rods. The biasing forces are exemplified in FIG. 5 in which forces F illustrate the direction of forces applied on the shuttle or carriage 32 and the wheels 34, 36 to ensure that the wheels remain engaged within the channels 22 irrespective of which rods they are mounted on. The specific mechanism by which inwardly directed biasing forces are applied is not critical in any number of different ways can be used, such as springs, magnets, rubber bands or the like, with different degrees of advantage. Referring to FIG. 6, one such mechanism is illustrated in which tension springs 38 are used to draw the shuttle or carriage 32 towards the receiver 24 and, therefore, the drawer the shuttle or carriage towards the axis A to ensure that the wheels 34, 36 remain within the channel 22. Although not critical, the wheels 34, 36 may form part of a rack and pinion arrangement in which a linear gear or rack is provided within the elongate channel or groove 22 while the rollers or wheels 34, 36 are in the form of circular gears or opinions arranged to engage the internal linear gear or rack (not shown).

Referring, for example, to FIG. 2 the outermost rod 16 a is shown provided with dimensional indicia in the form of a scale 18 that can be visually read by a user. Any visual scales used on conventional grade rods can be used. The other rods 16b-16d have similar scales on their like front surfaces. A feature of the present invention is that the front surface 16e is also provided with dimensional indicia in the form of a machine-readable indicia 20 to provide two different forms of readouts, one visual and the other readable by a reader module, such as the one indicated by reference 30 in FIG. 4. The reader module 30 may be of any known linear encoder for converting the machine-readable indicia 20 into a position read out of the receiver 24 in the form of an analog or digital signal that can then be decoded into position by any known motion controller. Linear encoders include optical, magnetic, inductive, capacitive and eddy current encoders.

The grade rod 10, therefore, extends like a telescope but effectively does not have barriers on the side. The built-in wheels on the side of the rods eliminates the need to use clamps or other tightening mechanisms to adjust for the higher heights when the rods are extended or telescoped. The channels on the sides of the rods guide the wheels as far up as needed without having to clamp and re-clamp that eliminates this manual and burdensome step. Any known means may be used to maintain the position of the receiver 24 at a selected position of the rods once the user releases the receiver. The wheels 34, for example, may be provided with sufficient static friction to overcome the weight of the receiver 24 and the shuttles or carriages 32. Since the weight of these is relatively low the amount of static friction can also be low and can easily be overcome by the user when physically moving the receiver 24 upwardly or downwardly.

Figure 7:
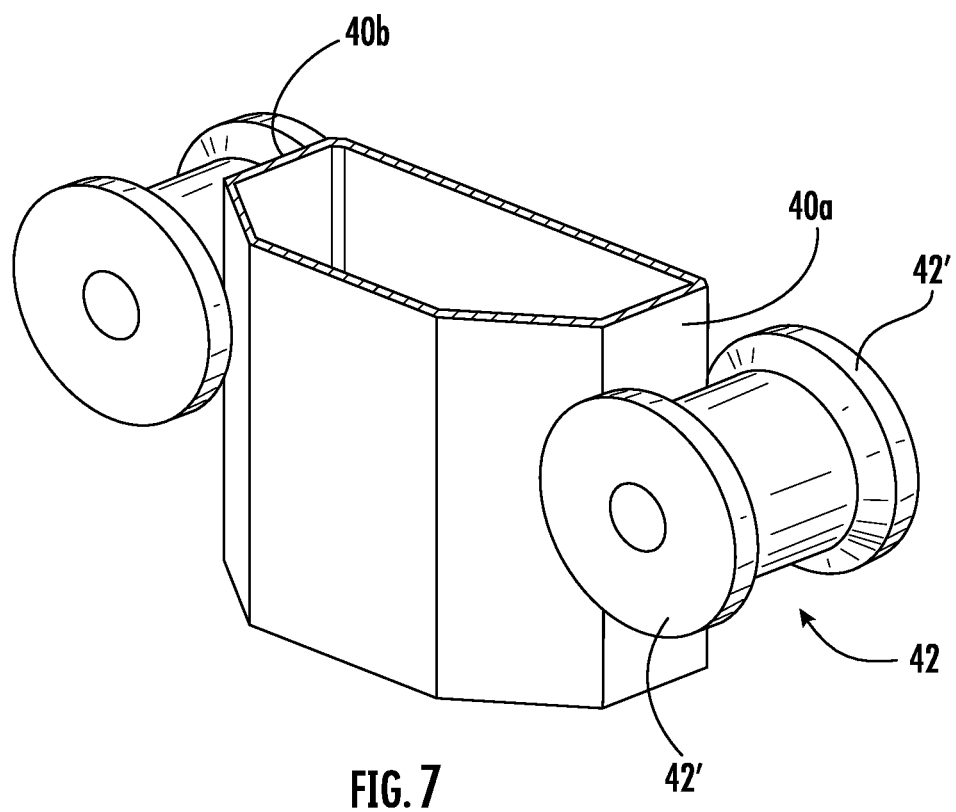
FIG. 7 illustrates another embodiment of a grade rod having flat lateral ends that engage rolling bobbins having complementary profiles.
Figure 8:
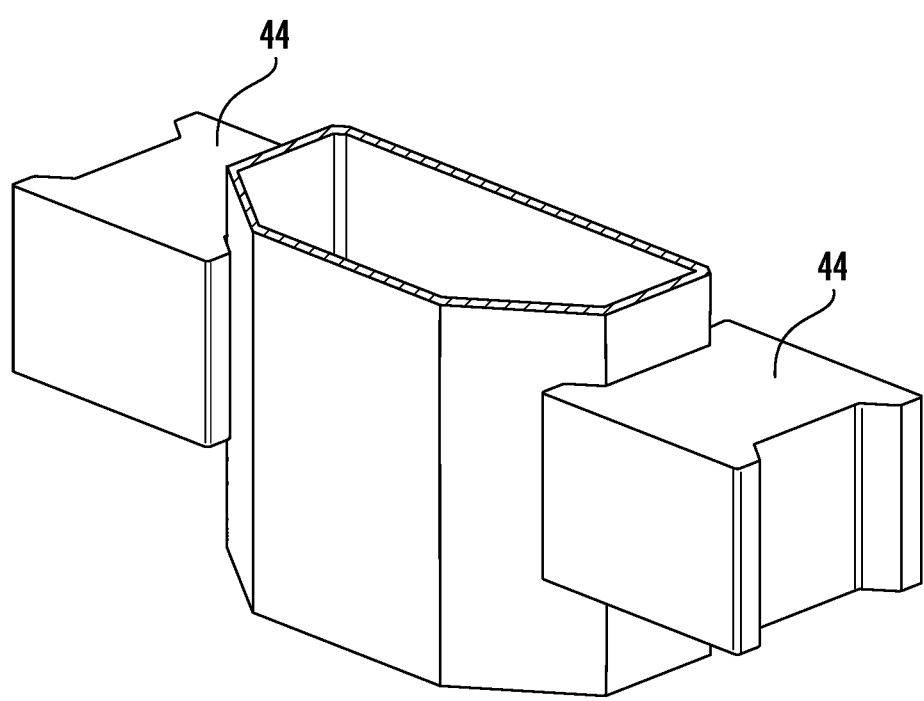
FIG. 8 is similar to FIG. 7 with mating blocks are provided with complementary profiles for relative sliding movements along the rods.
Figure 9:
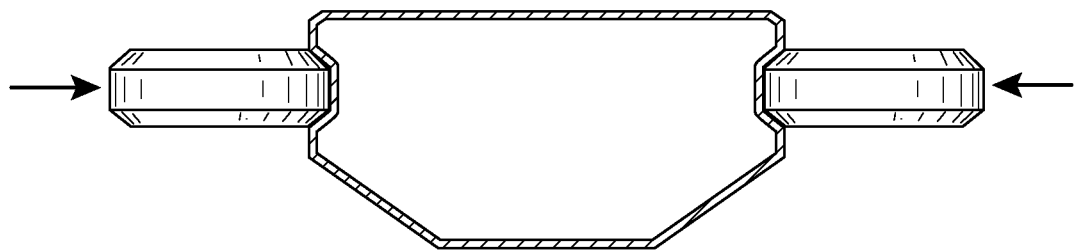
FIG. 9 is similar to FIG. 8 in which the rods have lateral channels or grooves and the sliding members are received within the channels or grooves having complementary profiles.
Figure 10:
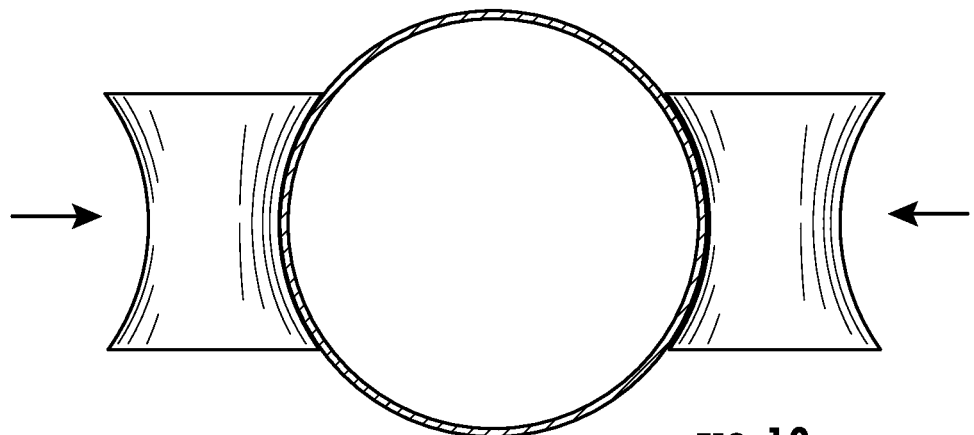
FIG. 10 illustrates a rod with a circular cross-section and the mating adjustable members are rolling or sliding members that have complementary concave surfaces to mate with the exterior circular cylindrical surface of the rod.
Figure 11:
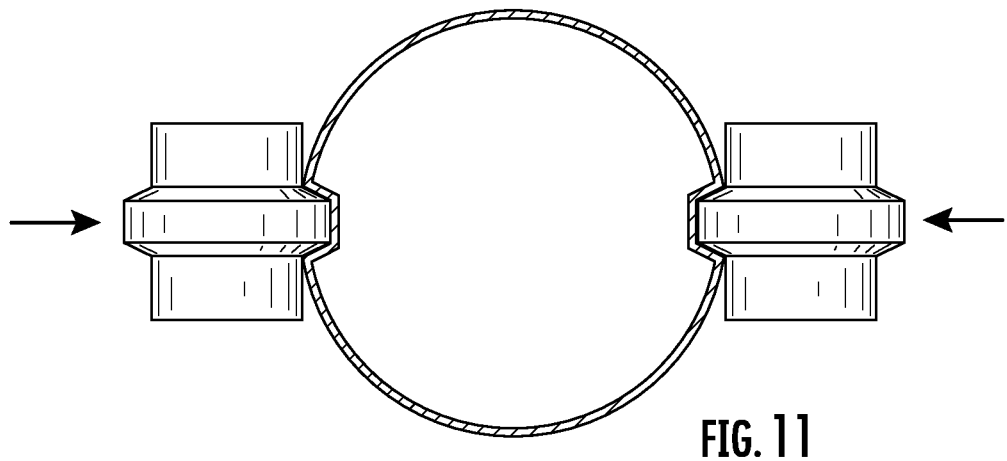
FIG. 11 is similar to FIG. 10 in which the rod is provided with lateral channels or grooves and mating adjustable members are rolling or sliding members that have mating profiles receivable within the channels or grooves.

As suggested, the shapes of the telescoping rods is not critical and can assume almost any cross-section. In FIG. 7, the rods 40 have lateral end surfaces 40a, 40b that are flat and form a first profile. The adjusting means are in the form of bobbins 42 having axial ends formed as flanges spaced to correspond to the widths of the flat surfaces to form complementary profiles to the shapes of the end or lateral surfaces of the rods so that the rods and bobbins remain engaged when urged against the rods irrespective of the width dimensions of the rods. In FIG. 8, sliding blocks 44 are used to engage the rods in a similar fashion. Any other complementary or engageable shapes can be used to engage the adjustable members with the rods or tubes having varying cross-sectional shapes as long as the adjustable members have profiles that are complementary or engageable to the profiles of the lateral ends of the rods, as exemplified in FIGS. 9-11.

Figure 12:
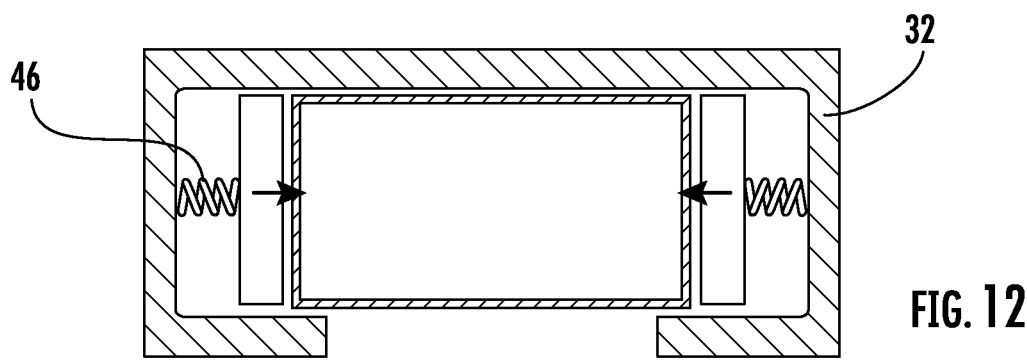
FIG. 12 illustrates a rod having a rectangular cross-section surrounded on three sides with a shuttle or carriage and adjustable sliding members on opposing sides of the rod biased towards the rod by compression springs acting between the carriage and the sliding members.
Figure 13:
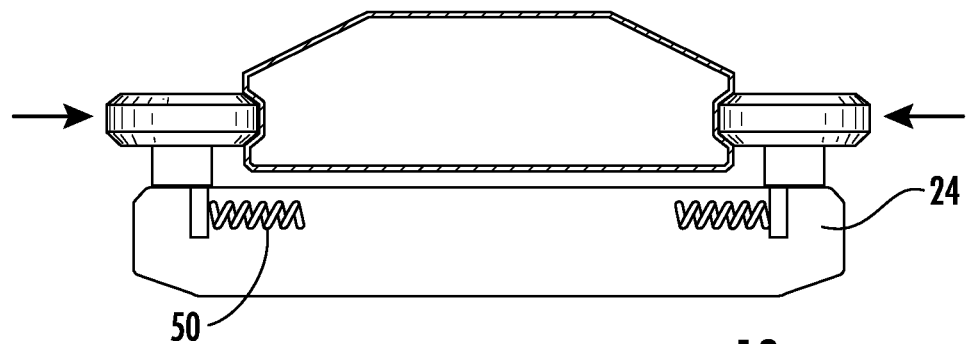
FIG. 13 illustrates the use of tension springs within the receiver for biasing the adjustable wheels or sliding members to insure that they remain fully engaged within the associated channels or grooves.
Figure 14:
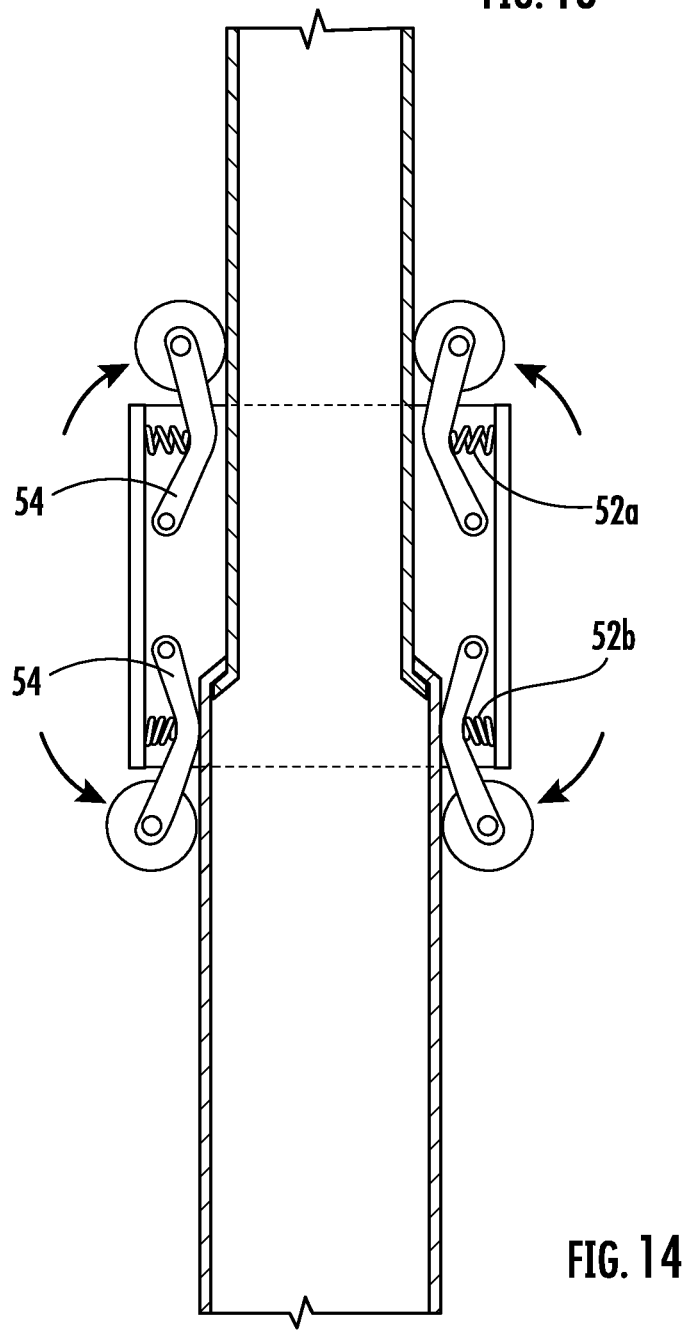
FIG. 14 illustrates two sets of spaced rollers inwardly biased by compression springs acting between the rods and a shuttle or carriage similar to arrangement shown in FIG. 12.

The biasing members or elements used to urge the adjustable members against the rods is likewise not critical and different biasing members can be used, with different degrees of advantage. In FIG. 12 the carriage 32 has a C-shaped cross-section as shown and compression springs 46 extend between the walls of the carriage 32 and the adjustable members 48 that can be sliding blocks as shown or, if rotatably mounted, can also be rollers. In FIG. 13 tension springs 50 are mounted on the receiver as shown. In FIG. 14 compression springs 52a, 52b act between the carriage and arms or levers 54 pivotably mounted on the carriage as shown.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An extendable grade rod receiver comprising a plurality of elongate telescoping rods moveable relative to each other along an axis and having an outermost rod having a predetermined width and successive inner rods from said outermost rod having incrementally smaller widths, each rod defining an elongate front surface and opposing left and right elongate lateral ends, each two adjacent contacting rods forming an exterior step or discontinuity substantially equal to the incremental widths between the two adjacent contacting rods, said rods being provided with a first profile along at least one of said lateral ends; a receiver for receiving a reference beam from a remote transmitter; a carriage movable along said telescoping rods and coupled to said receiver to share movements along said axis with said receiver, said carriage being provided with adjustable means forming a second profile generally conforming to or complementary to said first profile to engage therewith to allow movements of said adjustable means to move relative to and along said telescoping rods along said axis, said adjustable means also being moveable in directions generally normal to said axis and being biased inwardly towards said axis to maintain said adjustable means in contact or in abutment against each of said rods as said carriage moves over a step or discontinuity as it moves from one rod to a next adjacent rod.

2. An extendable grade rod receiver as defined in claim 1, wherein said rods are substantially flat and have left and right edges that form said left and right elongate lateral ends.

3. An extendable grade rod receiver as defined in claim 2, wherein said at least one of said lateral ends of each rod is formed with an elongate channel or groove.

4. An extendable grade rod receiver as defined in claim 3, wherein both of said left and right lateral ends of each rod is formed with an elongate channel or groove.

5. An extendable grade rod receiver as defined in claim 4, wherein said telescoping rods are generally rectangular in cross-section and have left and right edges and said adjustable means are members receivable within said elongate channel or groove formed within each of said left and right edges.

6. An extendable grade rod receiver as defined in claim 4, wherein said adjustable means includes a roller or wheel receivable within said channels or grooves.

7. An extendable grade rod receiver as defined in claim 1, wherein said adjustable means includes a plurality of rollers or wheels spaced from each other along the direction of said axis.

8. An extendable grade rod receiver as defined in claim 1, wherein biasing of said carriage is provided by a spring.

9. An extendable grade rod receiver as defined in claim 8, wherein said spring has one end fixed to said receiver.

10. An extendable grade rod receiver as defined in claim 1, further comprising dimensional indicia on said elongate front surfaces that can be visually read by a user.

11. An extendable grade rod receiver as defined in claim 1, further comprising dimensional indicia on said elongate front surfaces in the form of machine readable indicia.

12. An extendable grade rod receiver as defined in claim 11, further comprising a reader module on said carriage for reading said machine readable indicia.

13. An extendable grade rod receiver as defined in claim 12, wherein said reader module is a linear encoder for converting said machine readable indicia into a position readout of said receiver.

14. An extendable grade rod receiver as defined in claim 11, wherein said dimensional machine readable indicia is selected from the group of optical, magnetic, capacitive, inductive and eddy current scales.

15. An extendable grade rod receiver as defined in claim 1, further comprising dimensional indicia on said elongate front surfaces including both machine readable indicia and a scale that can be visually read by a user.

16. An extendable grade rod receiver as defined in claim 1, wherein said first profiles are elongate channels or grooves and said adjustable means includes rollers or wheels forming said second profiles configured to be received within said channels or grooves.

17. An extendable grade rod receiver as defined in claim 1, wherein said first profiles are surfaces having predetermined depths and said adjustable means includes rotatably mounted bobbins with flanges spaced to generally correspond to said predetermined depths of said surfaces.

18. An extendable grade rod receiver as defined in claim 1, wherein said first profiles are surfaces having predetermined depths and said adjustable means includes members with flanges spaced to generally correspond to said predetermined depths of said surfaces to allow relative sliding movements therebetween.

19. An extendable grade rod receiver as defined in claim 1, wherein said telescoping rods are telescoping circular cylindrical tubes having circular cross-sections and said first profiles are convex surfaces formed by the exterior surfaces of said tubes and said adjustable means includes slideable members or rollers formed with concave surfaces generally corresponding to said convex surfaces.

20. An extendable grade rod receiver as defined in claim 1, wherein said first profile includes a linear gear or rack and said second profile includes a circular gear or pinion arranged to engage said linear gear or rack.

\* \* \* \* \*